United States Patent
Srinivasan et al.

(10) Patent No.: US 9,876,685 B2
(45) Date of Patent: Jan. 23, 2018

(54) HYBRID CONTROL/DATA PLANE FOR PACKET BROKERING ORCHESTRATION

(71) Applicant: VSS Monitoring, Inc., Sunnyvale, CA (US)

(72) Inventors: Saradha Srinivasan, Saratoga, CA (US); Andrew Harding, Scotts Valley, CA (US)

(73) Assignee: NetScout Systems, Inc., Westford, MA (US)

( * ) Notice: Subject to any disclaimer, the term of this patent is extended or adjusted under 35 U.S.C. 154(b) by 118 days.

(21) Appl. No.: 14/918,161

(22) Filed: Oct. 20, 2015

(65) Prior Publication Data

US 2017/0111230 A1    Apr. 20, 2017

(51) Int. Cl.
  *H04L 12/24*   (2006.01)
  *H04L 12/931*  (2013.01)
  *H04L 12/64*   (2006.01)
  *H04L 12/26*   (2006.01)

(52) U.S. Cl.
  CPC .......... *H04L 41/12* (2013.01); *H04L 41/0806* (2013.01); *H04L 41/0893* (2013.01)

(58) Field of Classification Search
  None
  See application file for complete search history.

(56) References Cited

U.S. PATENT DOCUMENTS

| | | | |
|---|---|---|---|
| 8,824,274 B1* | 9/2014 | Medved | H04L 45/02 370/217 |
| 2013/0212245 A1* | 8/2013 | Koponen | G06F 9/45558 709/223 |
| 2014/0269260 A1* | 9/2014 | Xue | H04L 41/12 370/225 |
| 2014/0269328 A1* | 9/2014 | Venkataswami | H04L 12/18 370/238 |
| 2015/0043382 A1* | 2/2015 | Arora | H04L 41/082 370/254 |
| 2016/0057054 A1* | 2/2016 | Lumezanu | H04L 45/48 370/256 |
| 2017/0006067 A1* | 1/2017 | Narain | H04L 41/0823 |
| 2017/0019337 A1* | 1/2017 | Fujinami | H04L 12/6418 |
| 2017/0250869 A1* | 8/2017 | Voellmy | H04L 41/0893 |

* cited by examiner

*Primary Examiner* — Charles C Jiang
*Assistant Examiner* — George Atkins, Jr.
(74) *Attorney, Agent, or Firm* — Locke Lord LLP; Scott D. Wofsy; Christopher J. Capelli

(57) ABSTRACT

A system for configuring one or more flows of captured data packets through a hybrid communication network is provided. The system includes first and second segments of the hybrid communication network. The first segment includes a stacked topology of communicatively coupled plurality of network captured traffic distribution devices. The second segment includes one or more OpenFlow switches configured for an OpenFlow protocol. The system also includes a management server communicatively coupled to the first and second segments of the hybrid communication network. The management server includes logic adapted to configure one or more data flows of captured data packets with respect to forwarding the captured data packets between the first and second segments of the hybrid communication network.

10 Claims, 11 Drawing Sheets

HYBRID CONTROL/DATA PLANE FOR PACKET BROKERING ORCHESTRATION

FIELD OF THE INVENTION

The present invention relates to techniques for determining an optimum route for the transmission of a traffic flow of captured data packets and, more particularly, relates to hybrid control/data plane for packet brokering orchestration.

BACKGROUND OF THE INVENTION

Traditionally, intelligent stacking technology for distributed traffic capture devices brings scalability, speed and fault tolerance to centralized network monitoring. Network traffic captured in distributed way requires a scalable centralized layer between network infrastructure and analytical equipment. This architecture creates a single logical traffic capture layer that automatically discovers and routes traffic to the designated monitoring tool via the highest-speed link and the lowest number of hops, changing the path as needed in event of link failure or reconfiguration.

Traditional network architectures, traditionally integrate both the forwarding (data) and the control planes in the same box (network element). In some known software-defined networking architectures, the network decouples these two planes and executes the control plane in a centralized element, such as a server that might be in different physical locations from the forwarding elements (switches). The use of a centralized architecture in a network enables the simplification of the switches implementing the forwarding plane and shifts the intelligence of the network into a number of controllers that oversee the switches. The challenge of such an architecture is mixing those new elements with advanced systems that possess greater capabilities than the simple forwarding elements and with legacy systems that support only a single approach to populating the forwarding (and filtering) database.

It is, therefore, desirable to configure and manage hybrid communication network which integrates both distributed and split network architectures.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a system for configuring one or more flows of captured data packets through a hybrid communication network is provided. The system includes first and second segments of the hybrid communication network. The first segment includes a stacked topology of communicatively coupled plurality of network captured traffic distribution devices. The second segment includes one or more OpenFlow switches configured for an OpenFlow protocol. The system also includes a management server communicatively coupled to the first and second segments of the hybrid communication network. The management server includes logic integrated with and/or executable by a processor of the management server. The logic is adapted to configure one or more data flows of captured data packets with respect to forwarding the captured data packets between the first and second segments of the hybrid communication network.

In another aspect, a method for configuring one or more flows of data packets through a hybrid communication network including a first segment and a second segment is provided. The first segment includes a stacked topology of communicatively coupled plurality of network captured traffic distribution devices. The second segment includes one or more OpenFlow switches configured for an OpenFlow protocol. A new data flow entry is received from a user. The new data flow entry includes at least ingress port information and egress port information. A determination is made whether the ingress port and the egress port belong to the same segment of the hybrid communication network. An optimum bridge connection between the first segment and the second segment of the hybrid communication network is identified, in response to the determination that the ingress port and the egress port do not belong to the same segment of the hybrid communication network. An optimum path from the ingress port to the egress port through the hybrid communication network via the identified optimum bridge connection is determined.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
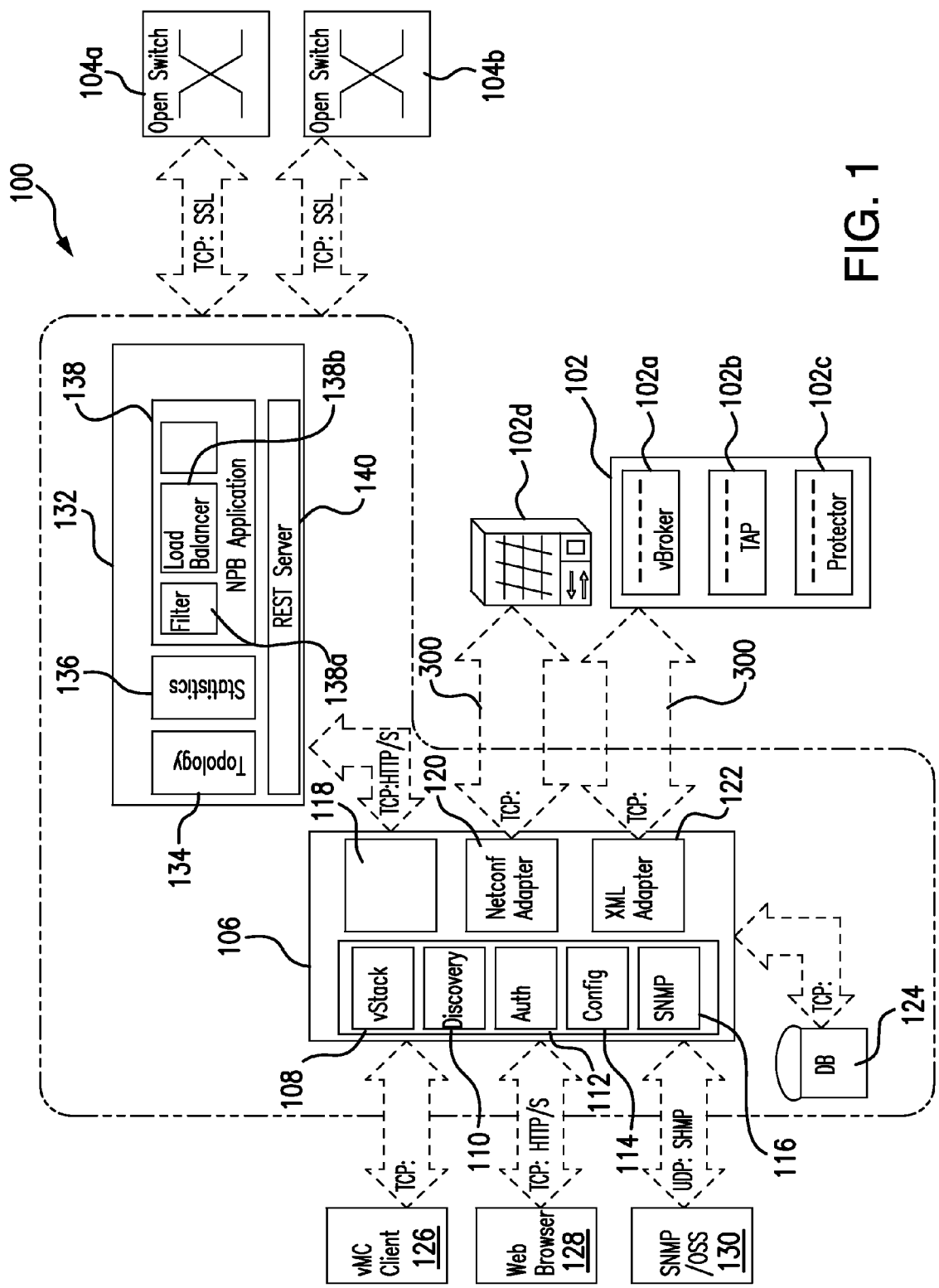
FIG. 1 is a system for configuring one or more flows of data packets through a hybrid communication network, according to one embodiment of the present invention.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated that the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hard-wired) or temporarily configured (e.g. programmed) to operate in a certain manner and to perform certain operations described herein.

Data centers are increasingly used by enterprises for collaboration and for storing data and/or resources. A typical enterprise network contains myriad network elements, including hosts, load balancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in enterprise networks are some of the challenges facing network managers. Network managers typically desire a resilient infrastructure that consistently supports diverse applications and services and protects the applications and services against disruptions. A properly planned and operating enterprise network provides application and data integrity and optimizes application availability and performance. In such networking environments, SDNs with open source software architecture, such as OpenFlow, are being increasingly used. Various embodiments of the present invention disclose interfaces between OpenFlow compliant architecture and existing proprietary systems having a distributed control plane. As discussed below, such interfaces/software modules can provide operational efficiency and utilization of resources for packet brokering orchestration.

FIG. 1 is a system for configuring one or more flows of data packets through a hybrid communication network, according to one embodiment of the present invention. For purposes of illustrating the techniques of hybrid communication network 100, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

SDN is a form of network virtualization in which the control plane is separated from the data plane and implemented in a software application. In the SDN architecture, the control and data planes are decoupled, network intelligence and state are logically centralized, and the underlying network infrastructure is abstracted from the applications. This architecture allows network administrators to have programmable central control of network traffic without requiring physical access to the network's hardware devices. SDN virtual networking combined with virtual machines (VMs) and virtual storage can emulate elastic resource allocation.

OpenFlow is a standard communications interface defined between the control and forwarding layers of an SDN architecture. OpenFlow allows direct access to and manipulation of the forwarding plane of network devices such as switches and routers, both physical and virtual (hypervisor-based). Most hypervisors include an OpenFlow compliant virtual switch that allows network connectivity to virtual machines residing on the hypervisors. The OpenFlow protocol is implemented on both sides of the interface between network infrastructure devices and the SDN control software. OpenFlow uses the concept of flows to identify network traffic based on pre-defined match rules that can be statically or dynamically programmed by the SDN control software. It also allows definitions of traffic flow through network devices based on parameters such as usage patterns, applications, and cloud resources.

In some embodiments of the present invention, the hybrid communication network 100 depicted in FIG. 1 may include one or more network elements (switches) 104 configurable and compatible with common protocols, including the OpenFlow protocol. As used herein, an Open Flow switch 104 is broadly defined as a piece of networking equipment (e.g., a router, switch, or similar networking device) that communicatively interconnects other equipment on the network (e.g., other network elements, end stations, or similar networking devices) and configured to utilize an OpenFlow protocol. Some OpenFlow switches 104 may comprise "multiple services network elements" that provide support for multiple networking functions (e.g., routing, bridging, switching, Layer 2 aggregation, session border control, multicasting, and/or subscriber management), and/or provide support for multiple application services (e.g., data collection).

In the following description and claims, the terms 'coupled' and 'connected,' along with their derivatives, may be used. It should be understood that these terms are not intended as synonyms for each other. 'Coupled' is used to indicate that two or more elements, which may or may not be in direct physical or electrical contact with each other, co-operate or interact with each other. 'Connected' is used to indicate the establishment of communication between two or more elements that are coupled with each other.

It is noted that OpenFlow switches 104 may comprise one or more standalone physical switches 104a and/or one or more virtual switches 104b. A virtual OpenFlow switch 104b enables network connectivity for one or more virtual machines (e.g., software implementation of a physical computing device) in a virtual network. Virtual switch 104b may include a memory element and a processor. The memory element may include a user space and a kernel space. In typical operating systems, system calls act as an interface between user processes (e.g., processes that execute in user space) and kernel processes (e.g., processes that execute in kernel space).

According to an embodiment of the present invention, in addition to a segment comprising SDN architecture (i.e. a plurality of OpenFlow switches 104) the hybrid communication network 100 may include a segment comprising a stacked topology of network captured traffic distribution devices 102. Furthermore, a plurality of communication devices (not shown in FIG. 1) is communicatively coupled both to the stacked topologies of network captured traffic distribution devices 102 and to the plurality of OpenFlow switches 104. Communication devices may be any device capable of generating, receiving, transmitting, and/or forwarding network traffic or a data packet, such as data packet to, for example, another communication device and/or a routing device via communication link. Exemplary communication devices may include personal computers, mobile computing devices, and mobile telephones. A data packet may be any type of data packet or amount of data transmitted via system 100. Exemplary network captured traffic distribution devices 102 include network captured traffic distribution devices, network taps, network bypass devices, network fail-safe devices, link bypass appliances, and firewalls.

According to an embodiment of the present invention, a mesh topology (described below) of network distribution devices 102 may include entry-level network packet brokers 102a, distributed TAPs 102b and protectors (which are in-line devices operating on active network traffic as opposed to monitoring-specific devices operating on a copy of network data) 102c. In one embodiment, distributed TAPs 102b provide targeted traffic access and tool redundancy and back-up, increasing network visibility and improving the performance and resilience of passive monitoring and security infrastructure. Protectors 102c can provide security tools with an aggregated view of all network traffic, so these tools can effectively and efficiently monitor, detect and mitigate network threats. Furthermore, the mesh topology may include one or more large capacity devices 102d described with greater particularity below in conjunction with FIG. 3F. In some embodiments, network captured traffic distribution devices 102 may include any switches configured for coupling to a standard interface for programming a forwarding information base (FIB). The FIB typically contains, for each route: identification of from which interface to forward a corresponding packet, as well as next hop information, and possibly a label to use when label switched routing is performed.

Figure 2A:
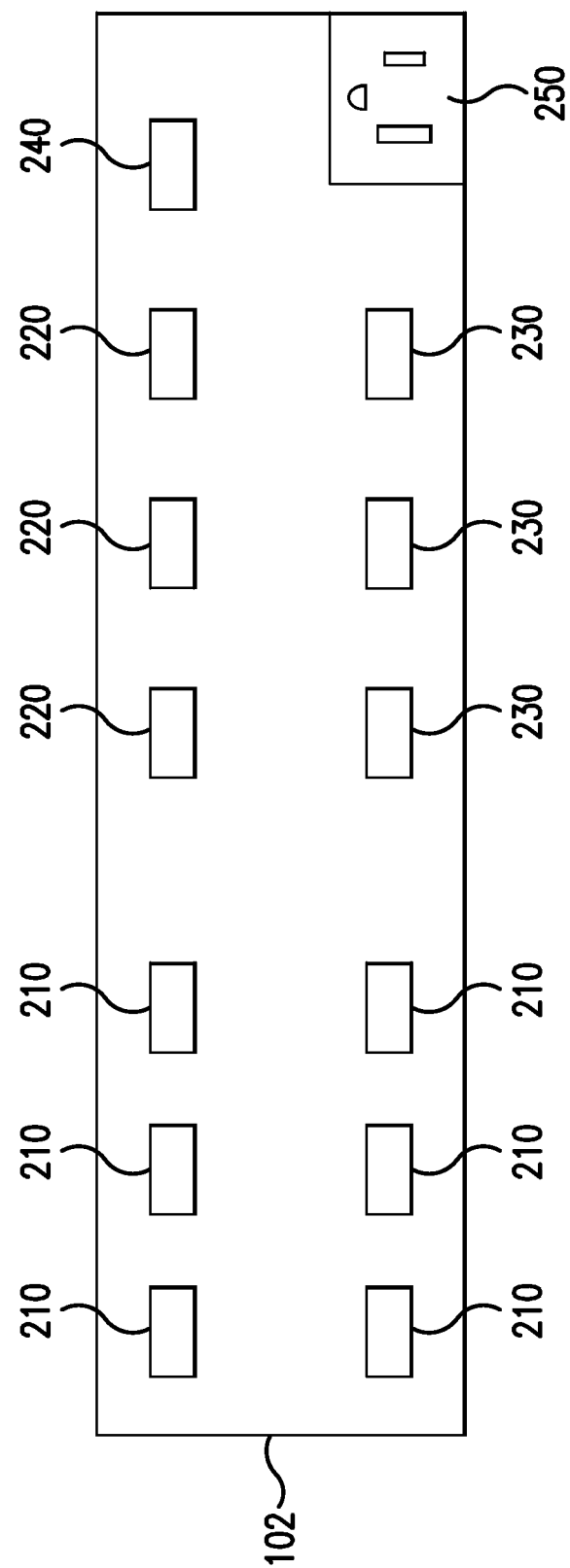
FIG. 2A is a block diagram illustrating an exemplary network captured traffic distribution device of FIG. 1, in accordance with an embodiment of the present invention.

FIG. 2A is a block diagram illustrating an exemplary network captured traffic distribution device, in accordance with an embodiment of the present invention. Network capture traffic distribution device 102 may include a plurality of bidirectional ports 210, a plurality of egress ports 220, a plurality of stacking 230 ports, a management port 240, and a power input 250.

Bidirectional ports 210 may be connected, via a communication link, to one or more sources of captured network traffic and may be compatible with, for example, a copper cable, a 10/100 Ethernet cable, a 1 gigabit (Gb) Ethernet cable, a 10 Gb Ethernet cable, a 40 Gb Ethernet cable, a 100 Gb Ethernet cable, a fiber optic cable and/or any combination thereof. Egress port 220 may be coupled to one or more external devices such as a monitoring device, a network analyzing device, a communication device, a protocol analyzer, a network data flight recorder, an intrusion detection system, a media analyzer, a signaling analyzer, a web analyzer, a database analyzer, a voice signaling analyzer, an Internet protocol television (IPTV) analyzer, an application analyzer, a voice analyzer, a telecommunications analyzer, and a forensic analyzer via a communication link such as a copper cable, a 10/100 Ethernet cable, a 1 Gb Ethernet cable, a 10 Gb Ethernet cable, a 40 Gb Ethernet cable, a 100 Gb Ethernet cable, a fiber optic cable and/or any combination thereof. On some occasions, one or more egress ports 220 may be configured as a monitor port or network analyzer port such that it is compatible with, for example, one or more external network monitor or analysis devices. In some cases, information associated with bidirectional ports 210 and/or egress ports 220 may be provided to a user and/or administrator via a user interface such as a graphic user interface (GUI).

Stacking ports 230 may enable the stacking of network captured traffic distribution device 102 with one or more additional network captured traffic distribution devices arranged in a stacked topology. Stacking a network captured traffic distribution device may include, but is not limited to, an exchange of data and configuration information between two or more communicatively coupled, or stacked, network captured traffic distribution devices. Stacking port 230 may be compatible with, for example, a copper cable, a 10/100 Ethernet cable, a 1 Gb Ethernet cable, a 10 Gb Ethernet cable, a 40 Gb Ethernet cable, a 100 Gb Ethernet cable, a fiber optic cable, and/or any combination thereof. In some embodiments, stacking ports 230 may be similar to egress ports 220.

Power input 250 may be any appropriate device via which electrical power may be supplied to network captured traffic distribution device 102 such as, but not limited to, an electric plug or an electric cable that may be coupled to a conventional electric wall outlet.

Network captured traffic distribution device 102 may be coupled to one or more networks such as a telecommunications network, a carrier Ethernet network, a voice over Internet protocol (VoIP) network, the Internet, a local area network (LAN), and/or a wireless LAN (WLAN) via one or more bidirectional ports 210 and/or egress ports 220.

Management port 240 may be coupled directly and/or indirectly to a user and/or administrator (i.e., a device accessible to/employed by such an individual) of network captured traffic distribution device 102 and/or a stacked topology of which network captured traffic distribution device 102 is a member. Instructions and/or information may be received by network captured traffic distribution device 102 via management port 240. Additionally or alternatively, configuration information associated with network captured traffic distribution device 102 and/or one or more functions performed by network captured traffic distribution device 102 may be accessed or managed via a GUI.

Figure 2B:
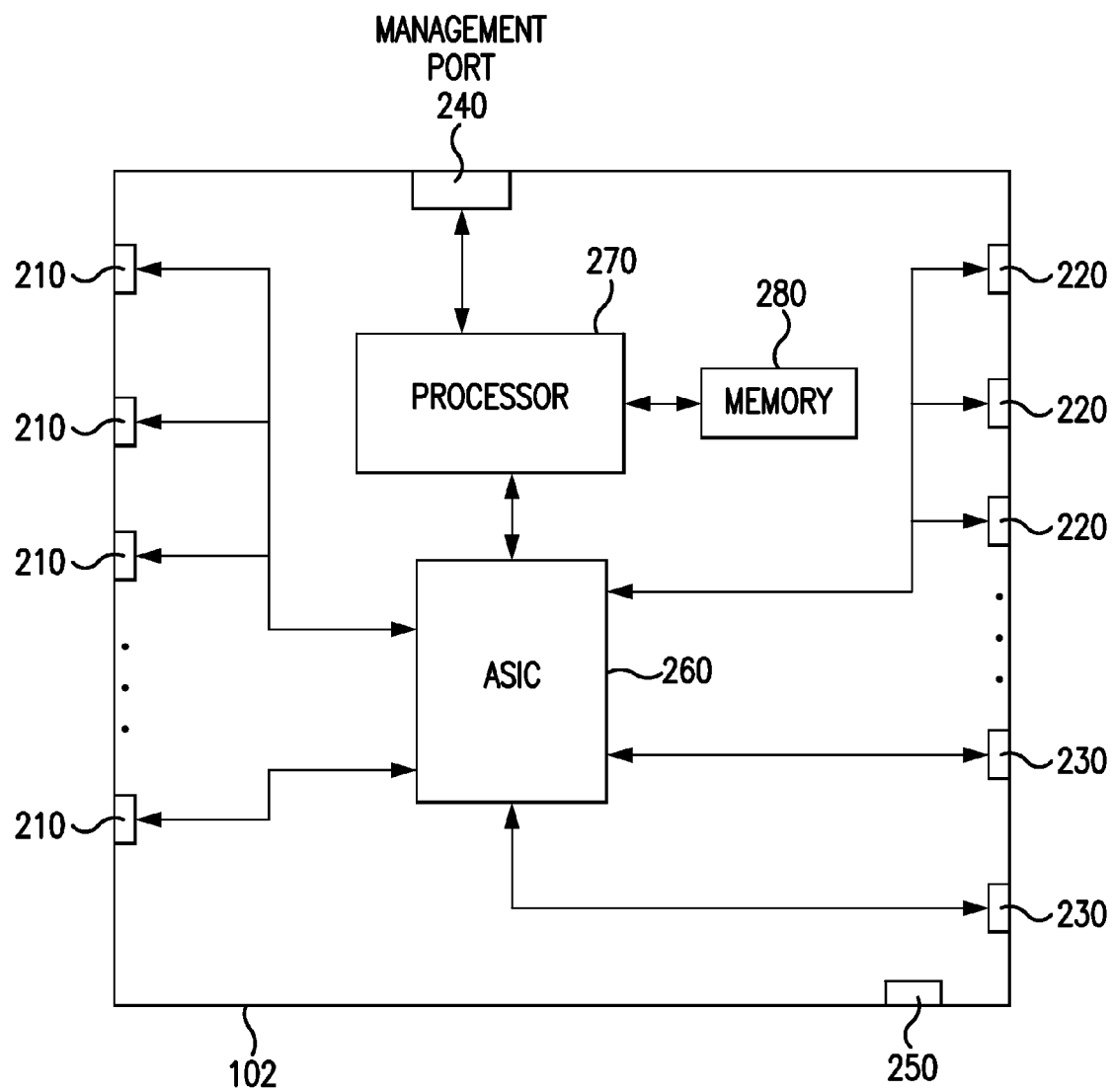
FIG. 2B is a block diagram further illustrating an exemplary network captured traffic distribution device of FIG. 1, in accordance with an embodiment of the present invention.

FIG. 2B is a block diagram of a network captured traffic distribution device 102 configured in accordance with an embodiment of the present invention. Network captured traffic distribution device 102 includes bidirectional ports 210, management port 240, egress ports 220, stacking ports 230 and power input 250. Bidirectional ports 210 may be connected to an application specific integrated circuit (ASIC) 260. ASIC 260 may be configured to distribute captured network traffic through network captured traffic distribution device 102. In some embodiments, ASIC 260 may be one or more analog or electric field effect transistor switches. ASIC 260 may further be configured to perform one or more switching functions thereby facilitating the switching and/or distribution of captured network traffic through network captured traffic distribution device 102 and/or the echoing of captured network traffic via one or more bidirectional ports 210. ASIC 260 may be coupled to a processor 270. Processor 270 may be any appropriate computer-processing device or devices such as a microprocessor, digital signal processor or similar device.

Processor 270 may be configured (e.g., under the control of suitable computer-executable instructions) to manage the distribution of received captured network traffic through the network captured traffic distribution device 102 and may be coupled to one or more data storage devices or memories 280. Distribution management executed by processor 270 may include, for example, the management of a flow of received captured traffic through network captured traffic distribution device 102 and/or a stacked topology that includes network captured traffic distribution device 102. Optionally, the distribution management may include, for example, determining a target destination for received captured network traffic; pre-calculating at least one route for the transmission of received captured network traffic from network captured traffic distribution device 102, through the stacked topology, to a target destination and determining an optimum route for the transmission of captured network traffic from network captured traffic distribution device 102, through the stacked topology, to a target destination.

The processor 270 may further be configured to enable peer-to-peer communication and/or peer-to-peer management between network captured traffic distribution device 102 and an additional stacked network captured traffic distribution device included in a stacked topology. In some instances, processor 270 may be enabled to manage the distribution of received captured network traffic through a stacked topology of network captured traffic distribution devices.

Memory 280 may be coupled, directly or indirectly, to processor 270 and/or ASIC 260 and may store one or more instructions executable by processor 270 and/or ASIC 260. Memory 280 may be configured to store an Internet protocol (IP) address assigned to network captured traffic distribution device 102. In some embodiments, the IP address assigned to network captured traffic distribution device 102 may be unique for each individual network captured traffic distribution device present in a stacked topology. Memory 280 may further store, for example, configuration information associated with network captured traffic distribution device 102, filtering information related to a plurality of pre-configured and/or customized user-created filters, data regarding captured network traffic received by network captured traffic distribution device 102, and the distribution and/or management of received captured network traffic by network captured traffic distribution device 102.

One or more stacking ports 230 may be configured to enable network captured traffic distribution device 102 to be stacked and/or communicatively coupled to at least one additional network captured traffic distribution device in a stacked topology. Exemplary configurations for stacked topologies include, but are not limited to, a ring topology, a mesh topology, a star topology, a topology of single links, a topology of multiple links, a topology including one or more redundant links, a topology including one or more large capacity network captured traffic distribution devices and/or any combination thereof. In some cases, stacking ports 230 may be configured as a monitoring port and may be compatible with one or more external devices.

When two or more network captured traffic distribution devices 102 are communicatively coupled, or stacked, in a topology, configuration information resident in one or more of network captured traffic distribution devices 102 may be exchanged between the two or more network captured traffic distribution devices 102. Exemplary configuration information may relate to, for example, the operation of the network captured traffic distribution device, the stacked topology, and/or a device or network coupled to the network captured traffic distribution device. For example, configuration information may include operational statistics associated with network captured traffic distribution device 102 such as an available ingress port or egress port transmission speed, a number of Switched Port ANalyzer (SPAN) ports available, filtering capacity information and an indicator of whether network captured traffic distribution device 102 is fully or partially operational.

Optionally, configuration information may also include instructions regarding the determination of a target destination, such as an external device and/or an egress port resident in the network captured traffic distribution device for captured network traffic. On some occasions, configuration may relate to the pre-calculation of at least one route for the transmission of received captured network traffic from a location, such as a source of captured network traffic, network captured traffic distribution device 102, or a port resident in network captured traffic distribution device 102, through the stacked topology, to a target destination or the retrieval of one or more pre-calculated routes from a data source such as memory 280 or an external device.

Configuration information may also relate to the determining an optimum route for the transmission of captured network traffic through the stacked topology to a target destination, filtering received captured network traffic according to one or more criterion and evaluating current operating conditions of the stacked topology and/or devices coupled to the stacked topology.

Figure 3A:
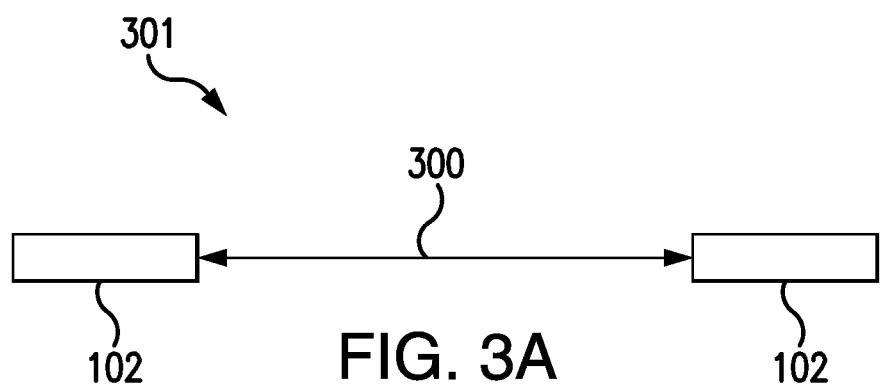
FIGS. 3A-3F are block diagrams depicting exemplary stacked topologies of network captured traffic distribution devices, in accordance with embodiments of the present invention.

FIGS. 3A through 3E are block diagrams illustrating exemplary stacked topologies of network captured traffic distribution devices, like network captured traffic distribution device 102. FIG. 3A illustrates an exemplary stacked topology 301 of two network captured traffic distribution devices 102 communicatively coupled, or stacked, via a communication link 300. Communication link 300 may be wired or wireless and may be enabled to facilitate communication between the network captured traffic distribution devices 102. For example, communication link 300 may be a wireless link capable of transmitting network traffic at a rate of, for example, 1 or 10 Gb/s or a wired link such as a 10/100 Ethernet cable, a 1 Gb Ethernet cable, a 10 Gb Ethernet cable, a 40 Gb Ethernet cable, a 100 Gb Ethernet cable, a copper cable, and/or a fiber cable.

Figure 3B:
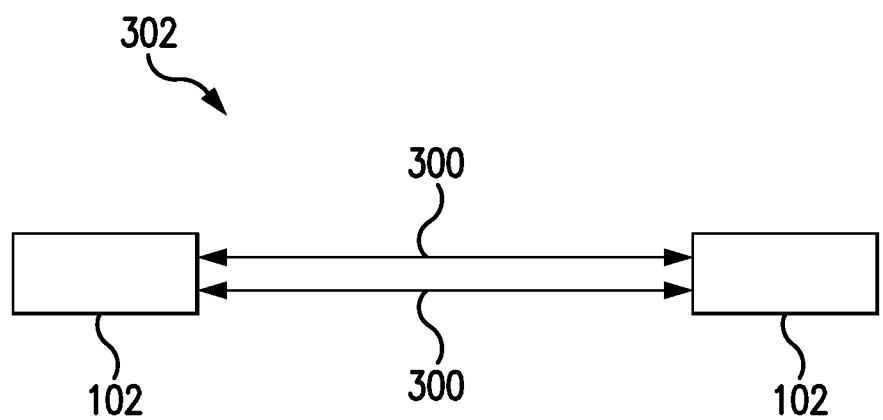

FIG. 3B illustrates an exemplary stacked topology 302 of two network captured traffic distribution devices communicatively coupled via two communication links 300. In stacked topology 302, communication links 300 may link two separate stacking ports resident on each of network captured traffic distribution devices 102 and, on some occasions, communication links 300 may be redundant and/or communication along communication links may be similar or redundant.

Figure 3C:
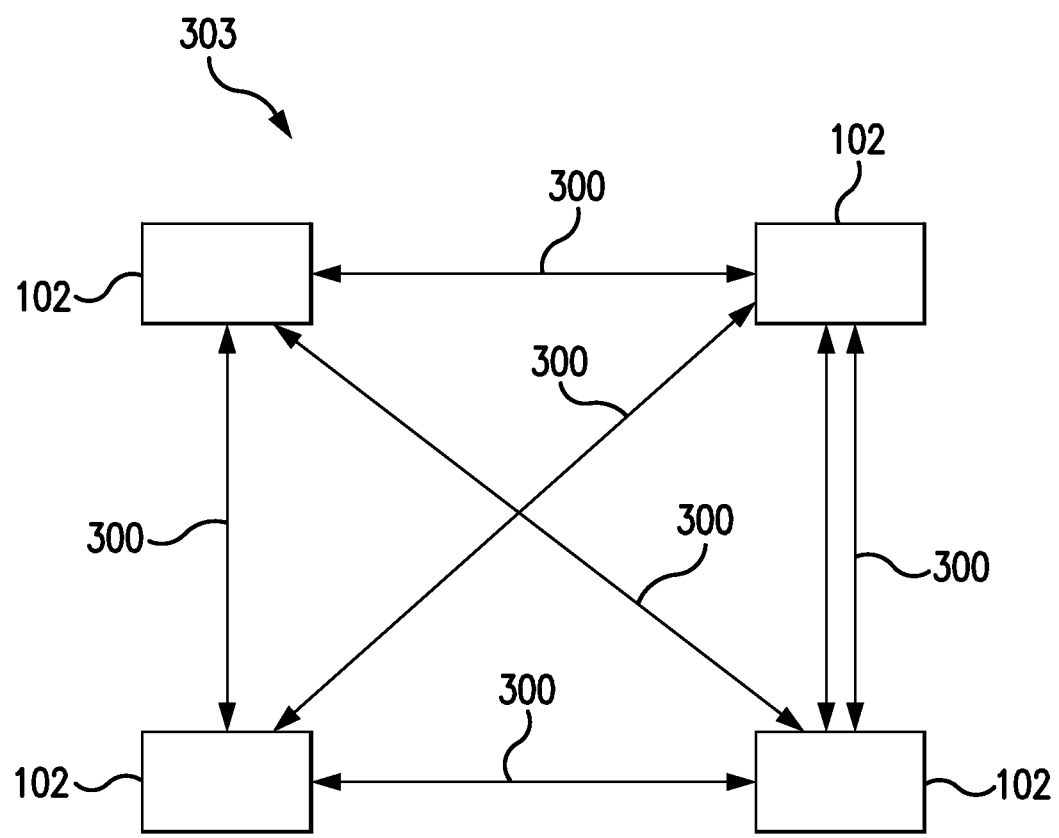

FIG. 3C illustrates network captured traffic distribution devices 102 arranged in an exemplary complex, or mesh, stacked topology 303. Complex, or mesh, stacked topology 303 includes four network captured traffic distribution devices 102 coupled via multiple communication links 300 such that every network captured traffic distribution device 102 is communicatively coupled, directly and/or indirectly, to every other network captured traffic distribution device 102 included in stacked topology 303.

Figure 3D:
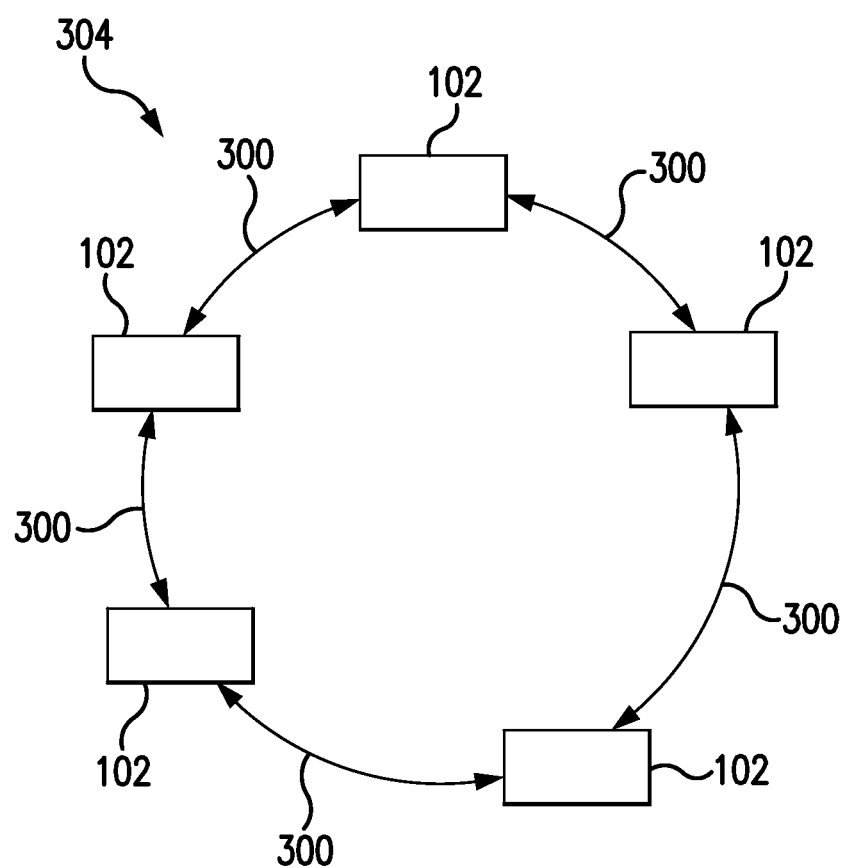

FIG. 3D illustrates an exemplary ring stacked topology 304 wherein five network captured traffic distribution devices 102 are communicatively coupled to one another in a round-robin or ring configuration arrangement via communication links 300.

Figure 3E:
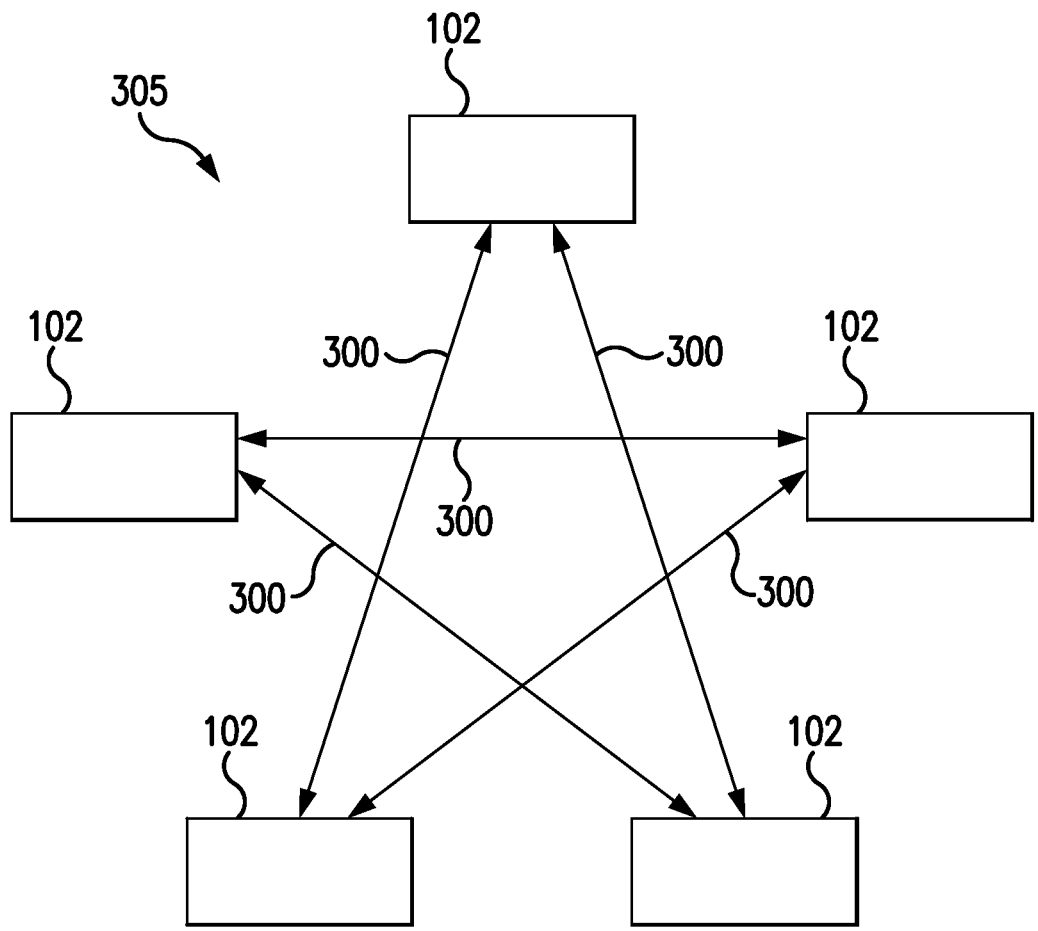

FIG. 3E illustrates an exemplary star stacked topology 305 wherein five network captured traffic distribution devices 102 are communicatively coupled to one another in a star shaped arrangement via communication links 300.

Figure 3F:
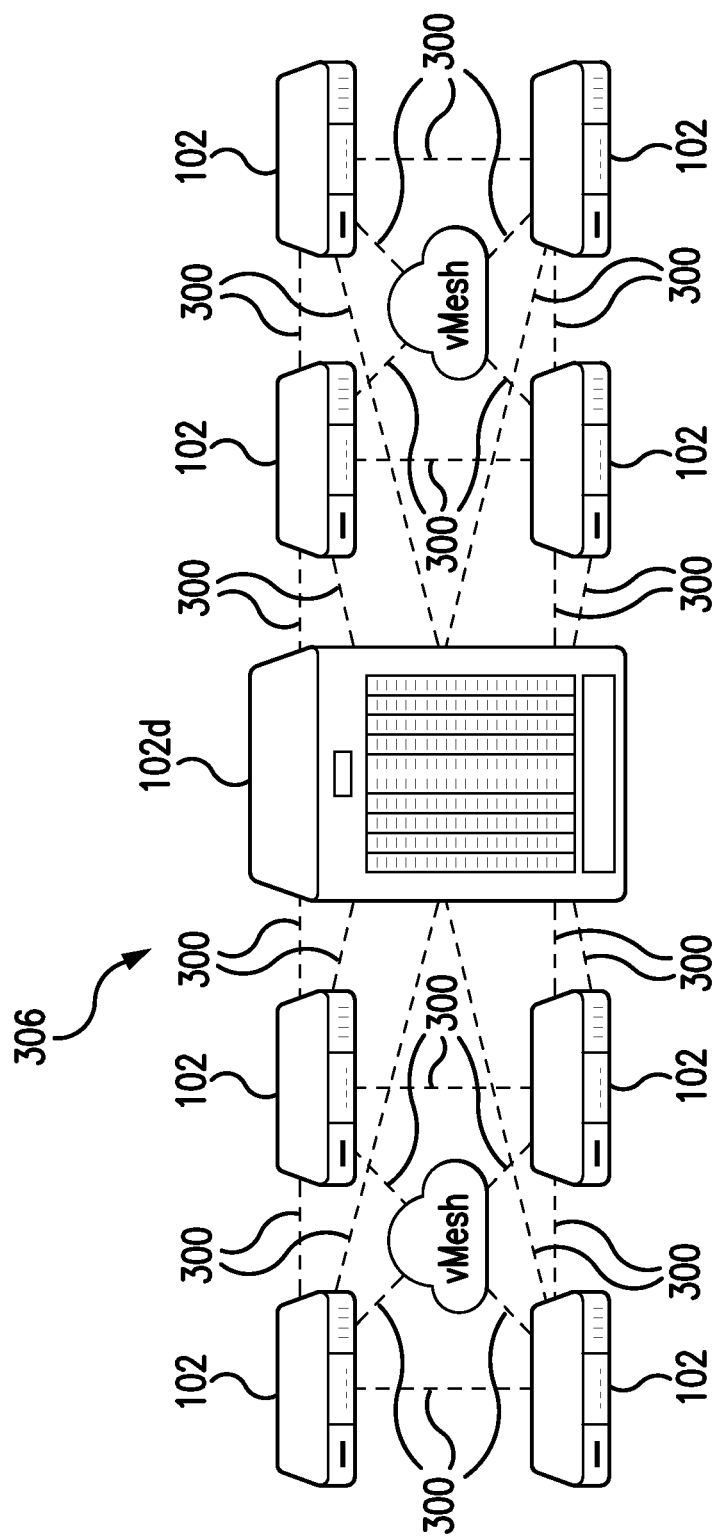

FIG. 3F illustrates an alternative mesh topology 306 including a large capacity device 102d. In the depicted mesh topology 306 a plurality of network captured traffic distribution devices 102 are communicatively coupled via multiple communication links 300 such that every network captured traffic distribution device 102 is communicatively coupled, directly and/or indirectly, to every other network captured traffic distribution device 102 included in stacked topology 306. Furthermore, in the illustrated mesh topology 306, every network captured traffic distribution device 102 is communicatively coupled, directly and/or indirectly, to a large capacity network captured traffic distribution 102d. In one embodiment, large capacity network captured distribution device 102d may include at least fifteen chassis that supports at least ten installed line cards, wherein each line card may support, for example, approximately 600 Gbps throughput.

The mesh topology can range from a single link between two network captured traffic distribution devices 102 to a full mesh among, for example, 256 network captured traffic distribution devices 102. Complex mesh topologies provide the benefit of bandwidth aggregation and redundant paths. For example, the illustrated mesh topology that includes one or more large capacity devices 102d may automatically aggregate bandwidth across parallel paths and redundant paths, automatically reconfigure monitor output to alternate paths in the event of link or network captured traffic distribution device 102 failure. In other words, the stacked topologies illustrated in FIGS. 3A through 3E provide a self-configuring, self-healing monitoring fabric, which allows the monitoring infrastructure of a global network to be fully interconnected.

Referring back to FIG. 1, it is noted that the stacked topology of network captured traffic distribution devices 102 can be managed from a single management server 106 communicatively coupled with the plurality of network captured traffic distribution devices 102 via multiple communication links 300. According to an embodiment of the present invention, management server 106 enables the visualization and centralized management of both segments of hybrid communication network 100. In various embodiments, management server 106 provides various configuration options for managing network captured traffic distribution devices 102 and Open Flow switches 104 individually including model specific settings and filters. It is noted that management server 106 may comprise logic integrated with and/or executable by a processor, wherein the logic is adapted to configure one or more data flows of captured data packets between the segments of hybrid communication network 100. Additionally, management server 106 offers several features that support the management of stacked topology architectures.

As shown in FIG. 1 the logic executable by management server 106 may include a plurality of software modules, including, but not limited to, vStack module 108, discovery module 110, authentication module 112, configuration module 114 and SNMP module 116.

According to an embodiment of the present invention, vStack module 108 is responsible for facilitating the configuration and management of topology information related to both segments of hybrid communication network 100. In one embodiment, vStack module 108 periodically polls the plurality of network captured traffic distribution devices 102 to get topology information. In some embodiments, if one or more communication links 300 (as shown in FIGS. 3A-3F) in the distributed stacked topology goes down, network captured traffic distribution devices 102 connected to the faulty communication link 300 alerts vStack module 108. Subsequently, vStack module 108 receives updated information from the plurality of network captured traffic distribution devices 102. Notably, embodiments of the present invention combine the stacking, forwarding and filtering, information learned from a distributed system with that gathered from elements that rely on the centralized system and present a single coherent network to the user after establishing the forwarding and filtering information base in the elements it controls in a manner that co-exists with the learned stacking elements.

Discovery module 110 is responsible for performing automatic discovery and configuration of the new communication devices in hybrid communication network 100. When a new network captured traffic distribution device 102 is added into the first network segment managed by management server 106, discovery module 110 obtains information about the newly added device during a discovery phase. In one embodiment, the obtained information may specify neighboring devices within the stacked topology. It is noted that discovery module 110 may obtain information from more than one set of elements. It may discover a new OpenFlow switch 104 from an SDN controller 132 described below.

Authentication module 112 is used by management server 106 to authenticate users by utilizing user identification information (i.e., user name and password) stored in database 124, for example. If authentication fails, the user may be presented with a demand to login by authentication module 112.

According to an embodiment of the present invention, management server 106 further includes a configuration module 114 which provides an ability to configure a variety of devices present in hybrid communication network 100. For example, configuration module 114 may provide various configuration options when managing the plurality of network captured traffic distribution devices 102 individually, including model specific settings and filters. In some embodiments, configuration module 114 may be also responsible for bulk configuration and software upgrades of the plurality of network captured traffic distribution devices 102. Furthermore, configuration module 144 may exchange the configuration data related to the plurality of OpenFlow switches 104 with SDN controller 132.

In one embodiment, configuration module 114 is further adapted to provide read and write commands to SNMP (Simple Network Management Protocol) management module 116. SNMP is a protocol that facilitates the exchange of information between devices over networks supporting TCP/IP. SNMP enables the plurality of network captured traffic distribution devices 102 that store information related to configuration management to communicate that information to SNMP management module 116. In addition, an SNMP agent, such as a software module resident on each of the plurality of network captured traffic distribution devices 102 preferably translates stacked topology information stored within the network captured traffic distribution devices 102 into a form that can be communicated with SNMP management module 116. SNMP management module 116 can further issue commands to SNMP agents in order to control the plurality of network captured traffic distribution devices 102.

Still referring to FIG. 1, the network configuration and management data may be presented to a user using one or more user interfaces. The user interface may be resident on a dedicated client machine 126. In alternative embodiments the user interface may comprise a web browser-based interface 128 and/or SNMP/OSS (Operation Support System) interface 130. Each user interface 126-130 may include a number of different view levels, ranging from a summarized hybrid communication network level view down to a specific port level view. Each view level includes different ways to display the data. For example, at the hybrid communication network level, a user may want to see the total number of network captured traffic distribution devices 102 and/or OpenFlow switches 104 deployed or the total number of outages. Other data view types include a configuration overview, specific details of identified network captured traffic distribution devices 102 and/or OpenFlow switches 104, path, routes, and the like. It is noted that one or more user interface(s) 126-130 may employ a plurality of protocols to communicate with management server 106. Such protocols may include, but are not limited to, TCP, HTTP, HTTPS, UDP, and SNMP.

As noted above, management server 106 is connected to both a plurality of network captured traffic distribution devices 102 and one or more OpenFlow switches 104. Note, management server 106 does not require physical connectivity to all network elements of the hybrid communication network that it supports, but may be connected logically, i.e. communicatively coupled, to all the infrastructure elements/devices by virtue of the physical connection to some of the network captured traffic distribution devices 102 which in turn have physical connections to other network captured traffic distribution devices 102 providing management server 106 logical connectivity. Similarly, management server 106 is connected logically to the plurality of OpenFlow switches 104, including one or more virtual switches 104a, via SDN controller 132 described in greater detail below. Management server 106 may communicate with the various elements of the managed hybrid communication network 100 using one or more of a variety of techniques. For example, the communication with large capacity devices 102d may take place via NETCONF (Network Configuration Protocol) messages, while the communication with the legacy network captured traffic distribution devices 102 may take place via Extensible Markup Language (XML) messages, or the like. Accordingly, to facilitate such communication, management server 106 includes both the NETCONF adapter 120 and XML adapter 122.

According to an embodiment of the present invention, configuration and management of OpenFlow compliant network segment can be logically centralized in software-based SDN controller 132, which can maintain a global view of the OpenFlow infrastructure 104 and ensure that all policies are consistently implemented across the SDN network (i.e., OpenFlow compliant network segment 104).

Figure 4:
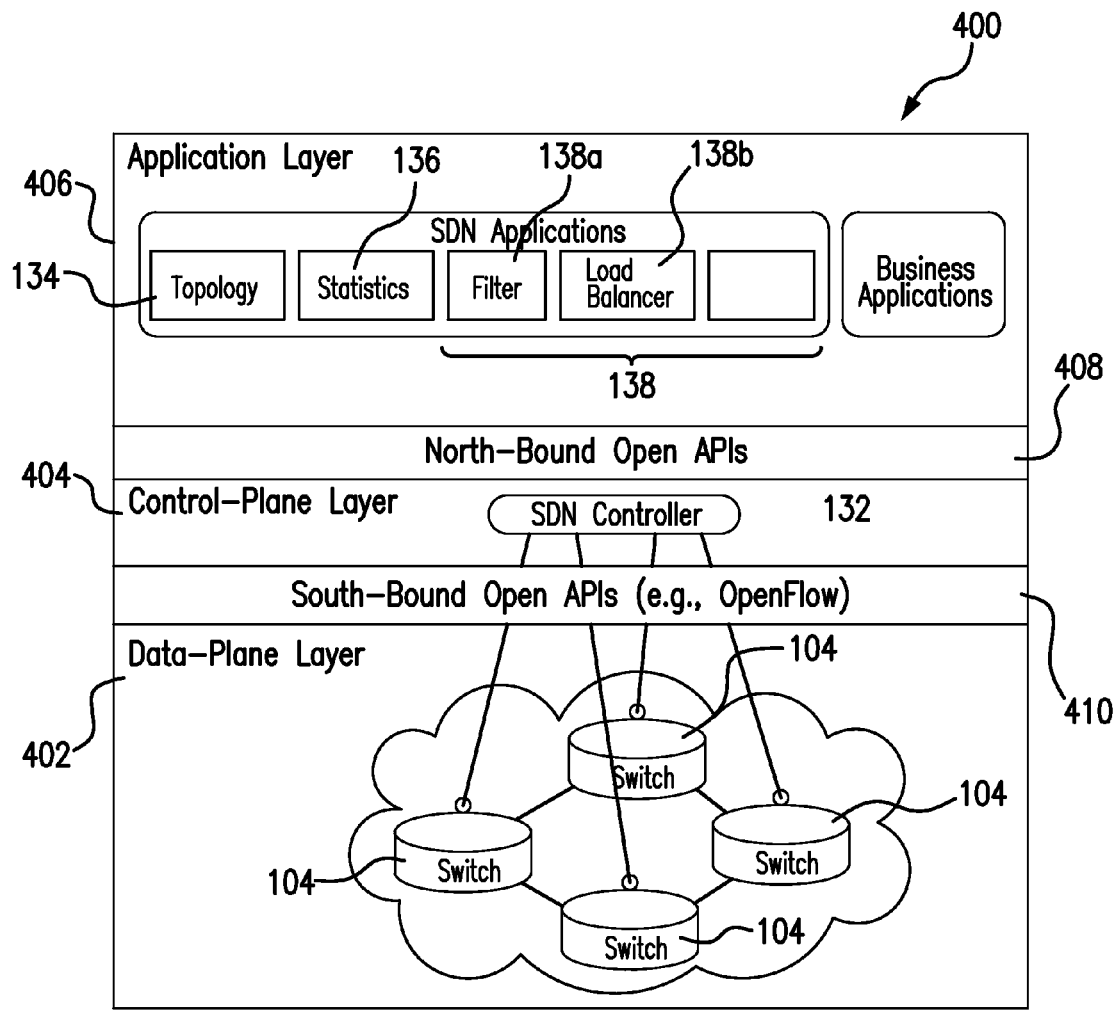
FIG. 4 is a block diagram of software defined networking (SDN) architecture segment implemented in the hybrid communication network of FIG. 1, in accordance with an embodiment of the present invention.

The SDN paradigm separates the network control plane from the data forwarding plane, and provides user applications with a centralized view of the distributed network states. The SDN architecture 400 includes three layers and interactions between layers as shown in FIG. 4. Control layer 404 globally regulates the network states via network policies in a centralized manner. Furthermore, SDN applications exist in application layer 406 of SDN architecture 400. A set of application programming interfaces (such as North-bound Open APIs 408) are supported to communicate between application layer 406 and control layer 404 in order to enable common network services, such as routing, traffic engineering, topology, statistics and many other forms of the network management. In other words, these interfaces facilitate various business objectives in the network management. According to an embodiment of the present invention, application layer 406 may include a network packet broker application 138 described further below. On the other hand, data plane layer 402 can employ programmable OpenFlow switches 104 through the controller, and the switches communicate with the controller via South-bound Open APIs 410 (e.g., OpenFlow protocol). The OpenFlow protocol provides network packet broker 138 and other applications access to the forwarding plane of network switches 104 and enables software programs running on OpenFlow switches 104 to perform packet lookups and forward the packets among the network of switches (or routers) 104. These programmable switches 104 follow the policies of the SDN controller 132 and forward packets accordingly in order to determine what path the packets will take through the switches 104. In short, through the interactions among the three layers 402-406, SDN controller 132 allows a unified and global view of complicated networks, and thus provides a powerful control platform for the network management over data traffic flows.

Referring back to FIG. 1, in one illustrative embodiment SDN controller 132 may comprise an OpenFlow Controller API 140. For example, the OFC API 140 may be a Representational State Transfer (REST) API (e.g., Floodlight REST API) that provides application interfaces for management server 106.

It is noted, the south-bound interface 410 is capable of supporting multiple protocols (as separate plugins), e.g. OpenFlow 1.0, OpenFlow 1.3, BGP-LS, LISP, SNMP, etc. These modules facilitate fulfillment of the service requested (by applications) irrespective of the underlying protocol used between the controller and the network devices.

In one embodiment, SDN controller 132 may include an OpenFlow plugin which may comprise a set of basic services such as statistics management module 136 and topology management module 134. Topology management module 134 may be used for control of all OpenFlow physical and virtual switches 104a-104b. After a new OpenFlow switch 104 is connected to SDN controller 132, a physical switch management module (not shown in FIG. 1) may report all the information contained in its ports. Also, topology management module 134 may send the link probes for detecting topological link structure of the OpenFlow compliant SDN network segment. In addition, when any physical OpenFlow switch 104a or virtual OpenFlow switch 104*b* is disconnected from controller 132, topology management module 134 amends the network topology information accordingly. Statistics module 136 is responsible for storage and collection of various statistics required to provide statistical services to other modules of SDN controller 132.

According to an embodiment of the present invention, in addition to a set of OpenFlow plugins which may provide a set of basic services, SDN controller 132 may include other tools and applications to manage the network segment comprising OpenFlow compliant physical and/or virtual switches 104. One of such SDN management applications may include network packet broker (NPB) application 138 which negotiates network traffic from multiple SPAN ports and manipulates it to allow more efficient use of monitoring devices like TAPs.

Various functions that may be provided by NPB application 138 include, but are not limited to, determining a target destination for received captured traffic, pre-calculating a route for the transmission of received captured traffic to a target destination, load balancing a distribution of received captured traffic through the STN network topology and filtering the received captured traffic. Accordingly, as shown in FIG. 1, NPB application 138 may include a filter module 138*a* configured to filter the received captured traffic, load balancer module 138*b* configured to load balance the distribution of received captured traffic through the STN topology, among other modules configured to perform the aforementioned functions as well as similar functions known in the art.

Figure 5:
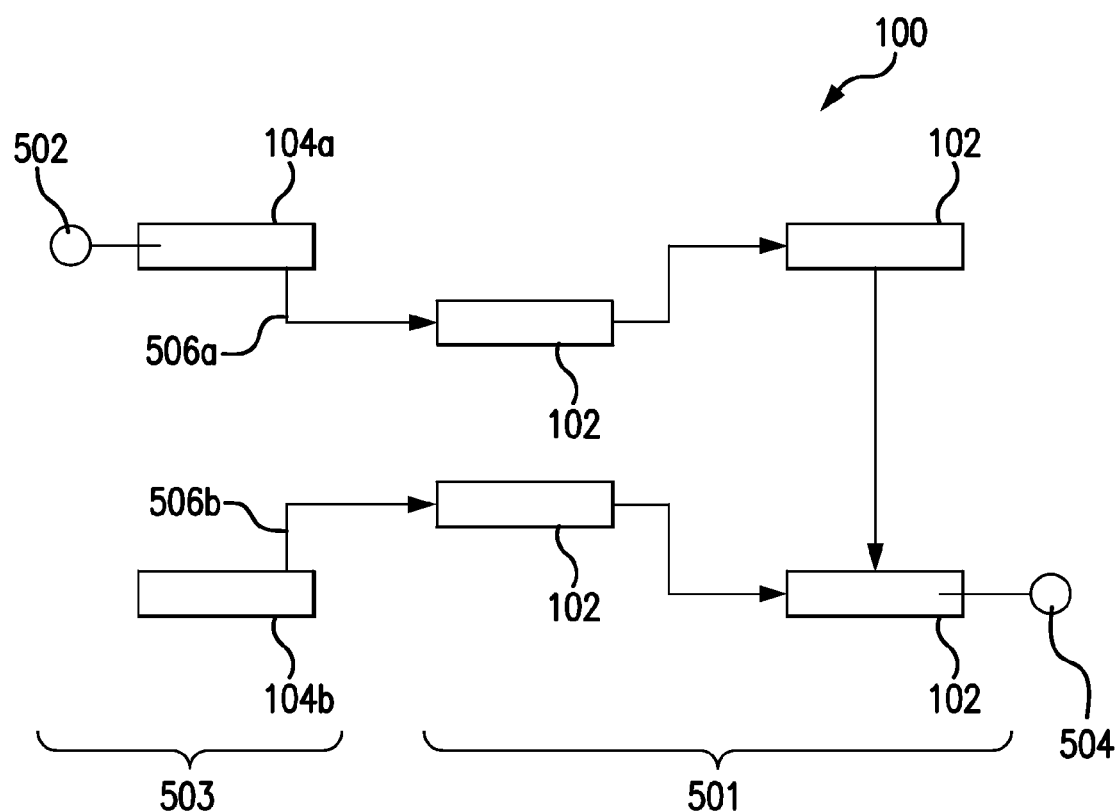
FIG. 5 is a simplified network diagram representing the hybrid communication network of FIG. 1, according to one embodiment of the present invention.

FIG. 5 is a simplified network diagram representing the hybrid communication network of FIG. 1, according to one embodiment of the present invention. In the illustrated embodiment, hybrid communication network 100 includes a first segment 501 comprising a plurality of network captured traffic distribution devices 102 physically interconnected with a second segment 503 comprising a plurality of OpenFlow switches 104 via two different bridge connections, i.e., a first bridge connection 506*a* and a second bridge connection 506*b*. It is noted that the OpenFlow switches connected to the first and second bridges 506*a*-506*b* may comprise both physical OpenFlow switches 104*a* and virtual OpenFlow switches 104*b*.

While only two OpenFlow switches 104, four network captured traffic distribution devices 102 and two bridge connections 506*a* and 506*b* are depicted in FIG. 5, it should be obvious that additional physical and virtual OpenFlow switches 104 and additional network captured traffic distributions 102 can be communicatively coupled to each respective segment of the shown arrangement. With these more elaborate arrangements, a greater number of interconnecting bridges would be required. Traffic flow management performed by management server 106 in concert with SDN controller 132 is not a trivial task, since each respective segment 501,503 of hybrid communication network 500 may include complex topologies, and since very high reliability is required.

Figure 6:
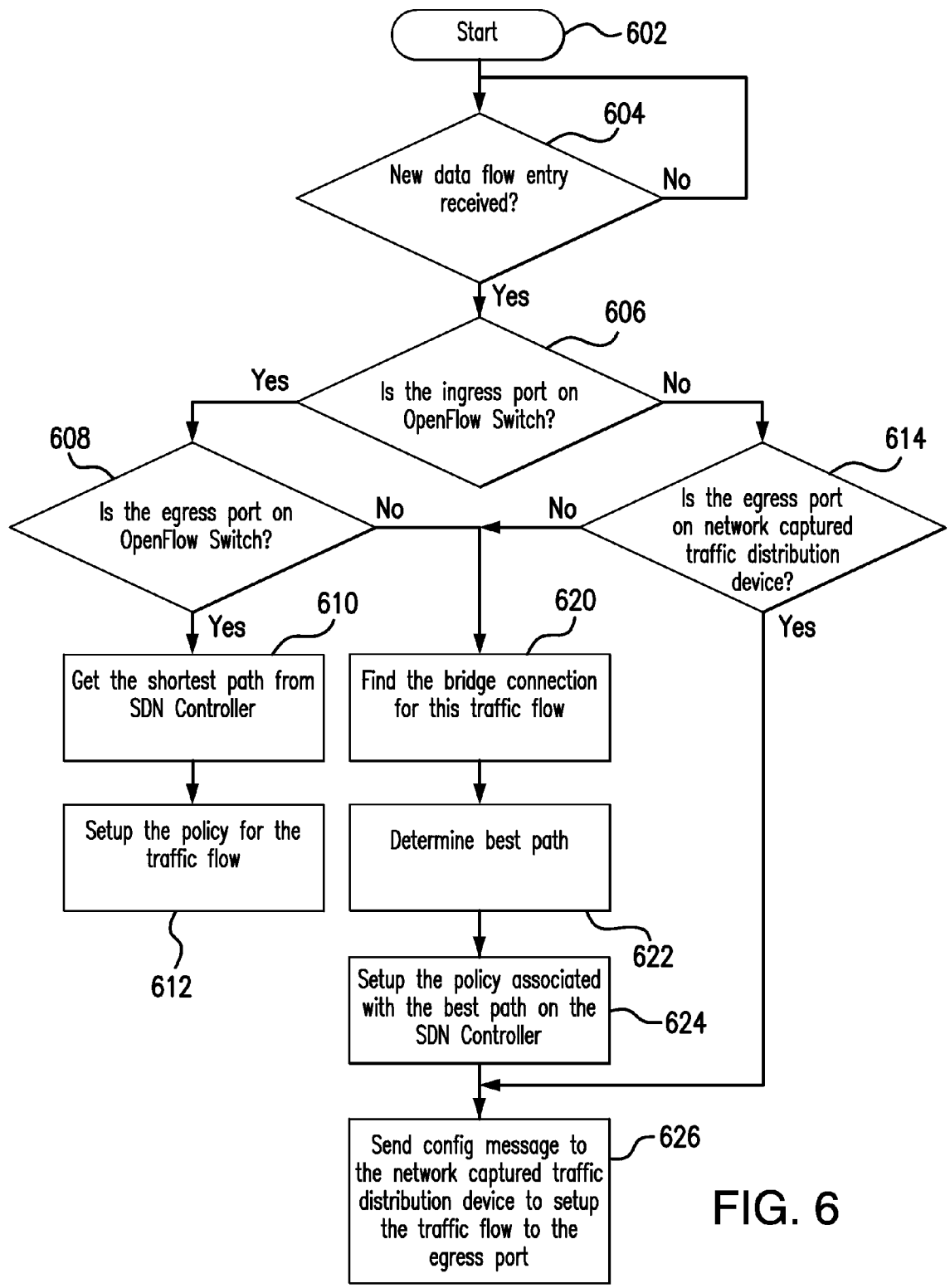
FIG. 6 is a flowchart illustrating an exemplary process for configuring one or more flows of data packets through the hybrid communication network of FIG. 1, in accordance with an embodiment of the present invention.

FIG. 6 is a flowchart illustrating an exemplary process for configuring one or more flows of data packets through the hybrid communication network of FIG. 1, in accordance with an embodiment of the present invention. Before turning to description of FIG. 6, it is noted that the flow diagram in FIG. 6 shows example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included. The method for configuring one or more flows of captured data packets may be executed on management server 106 shown in FIG. 1.

According to an embodiment of the present invention, the installation process for management server 106 includes installation and configuration of SDN controller 132. As previously noted, the centralized management server 106 adapted to work in concert with SDN controller 132 may have global knowledge both of network devices and of all the paths between the devices in hybrid communication network 100. Once management server 106 is up and running, it automatically discovers the plurality of network captured traffic distribution devices 102, the plurality of OpenFlow switches 104 and their respective capabilities based on the received stacked topology information and based on device capability profiles that may be stored in centralized database 124.

An administrator (e.g., a data traffic engineer) configures data traffic flows by assigning one or more ports (i.e., ingress port 502) from which to copy all packets and one or more ports (i.e., egress port 504) where those packets will be sent. In addition, the administrator preferably configures one or more stacking ports. As mentioned above, the stacking ports may enable the stacking of network captured traffic distribution device 102 with one or more additional network captured traffic distribution devices arranged in a stacked topology. Stacking a network captured traffic distribution device may include, but is not limited to, an exchange of data and configuration information between two or more communicatively coupled, or stacked, network captured traffic distribution devices. Conventionally, network elements, such as bridges and access points are also configured manually by an administrator having specialized technical knowledge associated with the topology of the hybrid communication network 100. During this network configuration phase, management server 106 is preferably operable to store the provided configuration information in centralized database 124 and/or forward the configuration information to either SDN controller 132 and/or the one or more additional network captured traffic distribution devices arranged in a stacked topology. For example, in one embodiment, if the network device being configured by the administrator comprises an OpenFlow switch 104, management server 106 stores the provided information in database 124. Alternatively, if the network device being configured by the administrator comprises one of the network captured traffic distribution devices 102, management server 106 transmits the provided port type information to the stacked topology of devices. It should be noted that for edge devices, such as devices at or near a pre-configured bridge connection (i.e., bridge connection 506), server manager 106 may perform both actions.

The method begins at a start step 602 and proceeds to step 604. According to an embodiment of the present invention, management server 106 may control the routing functionality of hybrid communication network 100 by propagating a plurality of rules and/or policies to the plurality of network captured traffic distribution devices 102 and plurality of OpenFlow switches 104. The rules and/or policies may be stored in a forwarding table (which may be referred to herein as a flow table) and may indicate how the various types of switches should forward the data flow through the hybrid communication network 100. In one embodiment, management server 106 may propagate the rules and/or policies in response to receiving a request from a network captured traffic distribution device 102 and/or OpenFlow switch 104. Management server 106 may also propagate the rules and/or policies in response to an ingress port (e.g., an ingress port 502 resident on the physical OpenFlow switch 104a shown in FIG. 5) receiving a data flow from a particular source. Thus, the OpenFlow protocol has built-in functionality for forwarding traffic. It will be understood that as used herein, a "flow" may refer to the stream of packets that are forwarded by a single rule in the set of programmable traffic forwarding rules. Thus, "flow" and "rule" are sometimes used to refer to the same granularity of monitoring and forwarding of packets.

According to an embodiment of the present invention, advantageously, management server 106 facilitates configuration of data flow rules in the hybrid network 100. However, management server 106 needs to receive flow entries from the administrator or another user/process via, for example, client interface 126 and/or web browser 128 (shown in FIG. 1). These flow entries, again, include information related to mapping logical ingress port 502 of the physical or logical switch 104 or network captured traffic distribution device 102 receiving data packets from an external device to destination egress port 504 resident on another physical or logical switch 104 or another network captured traffic distribution device 102.

As shown in FIG. 6, at step 604, management server 106 periodically determines whether a new data flow entry has been provided by a user and/or another process. In response to receiving a new data flow entry (decision block 604, yes branch), at step 606, management server 106 evaluates the received data flow entry to determine whether the ingress port belongs to one of the plurality of OpenFlow switches 104 supported by management server 106. If so (decision block 606, yes branch), at step 608, management server 106 further determines whether the destination port also belongs to one of the plurality of OpenFlow switches 104. If both the ingress port and the egress port belong to the same segment (i.e., second segment 503 in FIG. 5) of the hybrid communication network 100 (decision block 608, yes branch), management server 106 obtains information related to the shortest path between the source and destination OpenFlow switches from topology management module 134 of the SDN controller 132. Next, at step 612, management server 106 sets up the shortest path through the SDN network segment 503 by creating a corresponding traffic policy. According to an embodiment of the present invention, management server 106 imposes policies on flows via SDN controller 132 capable of talking to the physical and or virtual switches 104a, 104b via the OpenFlow protocol.

If in the decision block 606, management server 106 determines that the ingress port belongs to a network captured traffic distribution device ("no" branch), at step 614, management server 106 further determines whether the destination port also belongs to the stacked topology of the plurality of network captured traffic distribution devices 102. If both the ingress port and egress ports belong to the stacked topology segment 501 (decision block 614, yes branch), the management server 106 proceeds to step 626 described below.

According to an embodiment of the present invention, if the ingress and egress ports do not belong to the same segment of hybrid communication network 100 (decision blocks 608 and 614, no branches), at step 620, management server 106 finds an optimum bridge connection for the traffic flow being configured. As shown in FIG. 5, the hybrid communication network 100 topology may include multiple bridge connections (i.e., first bridge connection 506a and second bridge connection 506b). It is noted that in some implementations, management server 106 may execute one or more network topology discovery techniques and/or other route selection techniques. For example, operations described herein may be executed by management server 106 in conjunction with the Bridge Spanning Tree Protocol (STP). According to an embodiment of the present invention, at step 622, management server 106 obtains the latest topology information from the topology management module 134 of the SDN controller 132 and from the vStack module 108. Optionally, at step 622, a link/transmission speed of some or all of the communication links and network captured traffic distribution devices included in the stacked topology and/or OpenFlow switches coupled to the stacked topology may be determined. Also, at step 622, the network topology discovery operations may be executed in conjunction with load level analysis techniques. Finally, at step 622, management server 106 determines an optimum route for the transmission of the data flow from an ingress device (e.g., an ingress OpenFlow switch 104a where the ingress port 502 resides) to an egress device (e.g., an egress network captured traffic distribution devices 102 where the egress port 504 resides) based on the combined global view of the hybrid communication network 100 and based on the above mentioned analysis. In one embodiment, management server 106 determines an optimum route based on the filtering resource availability. The filtering resource availability analysis takes into account parameters, such as, but not limited to, a number of filters pre-configured by a user, a number of customized filters created by a user, a number of input SPAN ports configured as input ports for a filter on an ingress network captured distribution device and a number of vStack links available on a particular network captured distribution device if that device acts as a transit or egress device.

After determining an optimum path, at step 624, management server 106 generates a corresponding traffic policy. As previously noted, management server 106 imposes policies on flows transmitted through the OpenFlow-based segment of the hybrid communication network 100 via SDN controller 132 capable of talking to the physical and or virtual switches 104a, 104b via the OpenFlow protocol. Accordingly, at step 624, the generated policy may be sent to SDN controller 132 via REST adapter 118, for example.

Subsequently, at step 626, management server 106 sends a configuration message to the network captured traffic distribution device 102 physically connected to the bridge selected in step 620 to impose the generated traffic policy. In response to receiving the message, network captured traffic distribution device 102 propagates the configuration information through the stacked topology segment of hybrid communication network 100.

In summary, various embodiments of the present invention disclose a novel approach to configuration and management of hybrid communication network devices which use distributed and centralized control plane. In one aspect, software programming code embodying the present invention provides capability to communicate with an SDN controller to manage a plurality of OpenFlow devices. The OpenFlow protocol provides access to the forwarding plane of the OpenFlow segment of the hybrid communication network. The programmable switches comprising the OpenFlow segment follow the policies of the SDN controller and forward packets accordingly. In another aspect, the disclosed software modules enable unified management of both the OpenFlow compliant segment and the stacked topology segment comprising the plurality of network captured traffic distribution devices. In other words, in the hybrid communication network packets can be sent to span ports of any type of device and can be sent out to a plurality of monitoring devices, thereby seamlessly providing centralized orchestration and management. Additionally, as yet another benefit of the disclosed embodiments, the disclosed architecture further allows the seamless combination of a centralized control plane with a distributed control plane system (by combining discovery, filtering and forwarding capabilities among others) in a manner in which either control system can be self-organizing or manually defined while coexisting.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for configuring one or more flows of data packets through a hybrid communication network, the system comprising:
   a first segment of the hybrid communication network, the first segment comprising a stacked full mesh topology of communicatively coupled plurality of network captured traffic distribution devices;
   a second segment of the hybrid communication network, the second segment comprising one or more OpenFlow switches configured for an OpenFlow protocol; and
   a management server communicatively coupled to the first segment and to the second segment, the management server comprising logic integrated with and/or executable by a processor of the management server, the logic being adapted to receive new data flow entry from a user, the new data flow entry comprising at least ingress port information and egress port information; determine whether the ingress port and the egress port belong to the same segment of the hybrid communication network and configure one or more data flows of captured data packets with respect to forwarding the captured data packets between the first and second segments of the hybrid communication network in response to determining that the ingress port and the egress port do not belong to the same segment of the hybrid communication network.

2. The system as recited in claim 1, wherein at least one of the one or more OpenFlow switches comprises a virtual switch.

3. The system as recited in claim 1, the system further comprising a software defined network (SDN) controller communicatively coupled to the management server and connected to the second segment of the hybrid communication network, the SDN controller comprising logic configured to determine SDN routes through the second segment of the hybrid communication network.

4. The system as recited in claim 3, wherein the management server is configured to communicate with the SDN controller through a suitable application programming interface (API) at the SDN controller.

5. The system as recited in claim 4, wherein the API comprises Representational State Transfer (REST) API.

6. The system as recited in claim 1, wherein the stacked full mesh topology comprises a first network captured traffic distribution device communicatively coupled to a second network captured traffic distribution device via a communication link, wherein the first and second network captured traffic distribution devices are associated with configuration information, the first network captured traffic distribution device being configured to receive captured network traffic from a source, exchange configuration information with the second network captured traffic distribution device, and transmit received captured network traffic to the second network captured traffic distribution device, the second network captured traffic distribution device is configured to exchange configuration information with the first network captured traffic distribution device, receive captured traffic transmitted from the first network captured traffic distribution device, and transmit received captured network traffic toward a target destination, and wherein the communication link is configured to facilitate communication between the first and second network captured traffic distribution devices.

7. The system as recited in claim 6, wherein the stacked full mesh topology includes a fourth network captured traffic distribution device communicatively coupled to at least one network captured traffic distribution device via at least one stacking link.

8. The system as recited in claim 3, wherein the management server logic is further adapted to obtain topology information from the plurality of network captured traffic distribution devices.

9. The system as recited in claim 8, wherein the management server logic is further adapted to obtain topology information from the one or more OpenFlow switches using the SDN controller.

10. The system as recited in claim 9, wherein the management server logic is adapted to configure the one or more data flows of captured data packets between the first segment and the second segment of the hybrid communication network based on the obtained topology information.

* * * * *